April 20, 1954   J. W. DOWDY   2,675,709
INDIVIDUAL DRIVE ADAPTER FOR LINE SHAFT DRIVEN MACHINES
Filed July 26, 1952
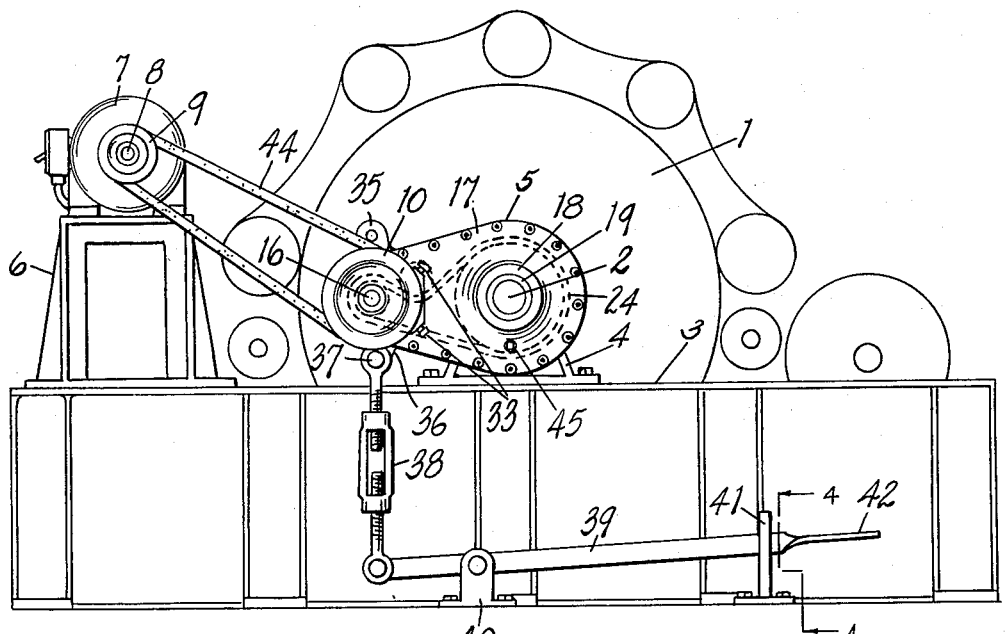
Fig. 1.
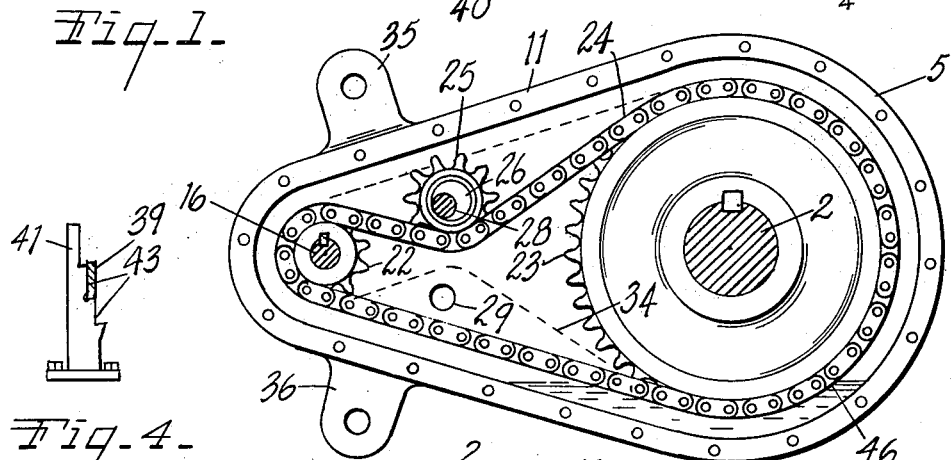
Fig. 4.
Fig. 2.
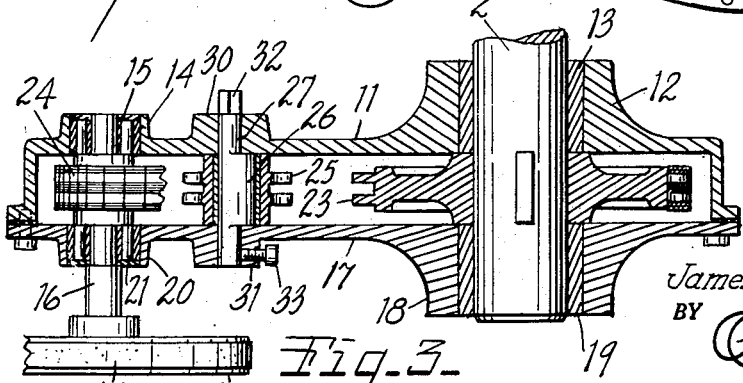
Fig. 3.
INVENTOR.
James Wright Dowdy
BY
Otis A. Earl
Attorney.

Patented Apr. 20, 1954

2,675,709

UNITED STATES PATENT OFFICE 2,675,709

INDIVIDUAL DRIVE ADAPTER FOR LINE SHAFT DRIVEN MACHINES

James Wright Dowdy, Moultrie, Ga., assignor to Adaptor Machine Company, Inc., Caledonia, Mich.

Application July 26, 1952, Serial No. 301,075

14 Claims. (Cl. 74—242.16)

This invention relates to improvements in individual drive adaptors for line shaft driven machines.

The principal objects of this invention are:

First, to provide a drive adaptor which is easily fitted to machines arranged for line shaft operation to permit the individual machines to be separately driven from individual drive motors.

Second, to provide an individual drive adaptor which is selectively attachable to either the right or left end of the drive or main shaft of the machine.

Third, to provide a drive adaptor that is silent and adjustable to permit driving of the machine in either forward or reverse direction.

Fourth, to provide an adaptor drive which utilizes a silent chain drive in speed reduction relationship between the motor and the machine with an idler sprocket that is adjustable to take up slack in the chain in either forwardly or reversely rotating motion of the machine.

Fifth, to provide an individual drive adaptor that incorporates a start and stop driving connection and drive belt tensioning arrangement in combination with the driving belt of the individual driving motor.

Sixth, to provide an individual drive adaptor that is inexpensive and easily installed and maintained by the ordinary maintenance personnel in any factory.

Other objects and advantages of the invention will be apparent from a consideration of the following description and claims. The drawings of which there is one sheet illustrate a highly practical form of the drive adaptor.

Fig. 1 is an end elevational view of a carding machine with the individual drive adaptor mounted thereon and connected with an individual electric motor.

Fig. 2 is an enlarged end elevational view of the drive adaptor with the cover plate thereof removed to illustrate the internal elements of the adaptor.

Fig. 3 is an enlarged fragmentary cross sectional view through the adaptor taken along the plane of a section line through the axes of the several shafts as indicated at 3—3 in Fig. 2.

Fig. 4 is a fragmentary vertical cross sectional view through the belt tensioning lever and locking bracket taken along the plane of the line 4—4 in Fig. 1.

While many machines are now provided with one or more individual driving motors there are still many machines that are driven from a common line shaft. It is well known that line shaft operation of several machines is inefficient and expensive to maintain but heretofore it has been impractical to adapt many existing machines for individual drive. The example of the individual drive adaptor is disclosed in connection with a carding machine but the adaptor is equally useful with any type of machine having a main shaft projecting therefrom. Since most machines arranged for line shaft operation will have their main shaft projecting for mounting of a drive pulley the present individual drive adaptor is almost universally adaptable to any machine arranged for line shaft operation.

The drawings illustrate conventionally a carding machine 1 having its main shaft 2 projecting from one end thereof. The carding machine is mounted on its conventional frame or base 3 and the main shaft is journaled in a bearing supported by the bearing bracket 4. The details of this structure form no part of the present invention and consists of the familiar type of machine construction that is part of the existing machine. It is sufficient to point out that the main shaft 2 projects axially beyond the bearing bracket 4 so that the individual drive adaptor indicated generally at 5 can be mounted on the projecting end of the shaft. The rear side of the base 3 is provided with a suitable motor supporting frame 6 on which the individual drive electric motor 7 is mounted. The position of the motor 7 is not critical as the motor can be mounted in any convenient position relative to the machine so long as its drive shaft 8 and pulley 9 are positioned in parallel relationship with the main shaft 2 and the driven pulley 10 on the drive adaptor as will be explained in greater detail presently.

The drive adaptor 5 includes a chambered housing 11 having a boss 12 formed on its rear or inner side and adapted to receive the bearing 13 that is slipped over the main shaft 2 of the machine. Spaced transversely from the boss 12 and bearing 13 is a second boss 14 which receives a roller or needle bearing 15 for rotatably supporting the rear or inner end of a stub drive shaft 16.

The front of the housing 11 is closed by a cover plate 17 and the cover plate is provided with a boss 18 that supports a bearing 19 coaxial with the bearing 13. The cover plate 17 also has formed thereon the boss 20 that supports a roller or needle bearing 21 co-axial with the bearing 15. The stub drive shaft 16 projects from the front of the cover plate and the pulley 10 is mounted on the front or outer end thereof. A small drive sprocket 22 is keyed to the stub drive shaft 16 and a drive sprocket 23 is keyed to the end of the main shaft 2 of the machine each within the housing 11. In the example illustrated the sprockets 22 and 23 are of the double chain type but this is a matter of engineering design which may be varied as desired. A pair of chains 24 or a double chain is trained around the sprockets 22 and 23 within the housing.

In order to adjustably take up the slack in the chain 24 there is provided an idler sprocket 25 that is also of the double chain type. The sprocket 25 is rotatively mounted on the eccentric portion 26 of an idler shaft 27. The idler shaft 27 is selectively positioned in pairs of journals formed in the bottom of the housing 11 and the cover plate 17. One pair of journals is positioned as at 28 above the center line extending between the centers of the main shaft 2 and the drive shaft 16. The other pair of idler shaft journals is positioned as at 29 below the center lines of the drive shaft and main shaft. Desirably the housing 11 and cover plate 17 are provided with a thickened boss portion 30 and 31 respectively through which the journal openings for the idler shaft are formed. The rear or inner end of the idler shaft is provided with a squared portion 32 which permits angular adjustment of the idler shaft and therefor adjustment of the eccentric portion 26 thereof to permit adjustment of the tensioning in the chain 24. A set screw 33 projects through the boss 31 on the cover to lock the idler shaft in its adjusted position.

In the arrangement of the drive adaptor illustrated in Figs. 1 and 2 the adaptor is arranged to drive the main shaft 2 in a clockwise direction as illustrated. Should it be desired to reverse the carding machine 1 as is periodically the case to sharpen the carding cylinder, it is simple to remove the cover plate 17 and fit the idler shaft 27 in the journal openings 29. The lower reach of the chain 24 is then trained upwardly around the idler sprocket 25 as is indicated by the dotted lines at 34 in Fig. 2 to maintain the chain in taut silently operating position for reverse drive of the carding machine.

Since the adaptor housing 11 is freely rotatable about the main shaft 2 on the bearings 18 and 19 it is necessary to provide means for anchoring the housing relative to the machine. For this purpose the housing 11 is provided with oppositely projecting ears 35 and 36 on opposite sides thereof and spaced from the bearings 18 and 19. These ears 35 and 36 are apertured to selectively receive a pin 37 for connecting the upper end of a longitudinally adjustable link 38 to the housing. The lower end of the link 38 is pivotally connected to the swinging end of a lever 39. The lever is pivotally supported intermediate of its end on a bracket 40 that is adapted to be fixedly mounted to the floor or other suitable support alongside of the machine 1. The forward end of the lever 39 projects through a lock bracket 41 and is provided with a pedal portion 42 for manipulation by the foot of the machine operator. As is more particularly illustrated in Fig. 4 the bracket 41 is provided with a plurality of lock notches 43 for selectively receiving the forward end of the lever 39 to adjustably hold the rear swinging end of the housing 11 relative to the machine. The link 38 and lever 39 clearly adjustably oppose the tension in the driving belt 44 which connects the motor 7 to the pulley 10.

The housing 11 and cover plate 17 are desirably made oil tight and the cover plate is provided with an oil filler hole and plug at 45 (see Fig. 1) so that a quantity of oil may be introduced into the housing to immerse the lower portion of the sprocket 23 and the chain as it travels therearound as is indicated at 46 in Fig. 2.

The example of the drive adaptor illustrated is simple and inexpensive and at the same time entirely satisfactory for adapting the machine to individual drive. Obviously various modifications and changes in the shape and details of construction of the adaptor may be made without departing from the spirit of the invention as defined in the following claims.

Having thus described my invention, what I claim as new and desire to secure by Letters Patent is:

1. In combination with a carding machine having a rotatable cylinder mounted on a base with the shaft of the cylinder projecting therefrom and an electric motor mounted in offset relation to one end of said cylinder and parallel to said shaft, a drive adaptor comprising, a chambered housing disposed on its side and having spaced journals formed in the bottom thereof, one of said journals receiving the projecting end of said shaft, a cover for said housing having other journals formed therein cooperative with the journals in said housing, a drive shaft journaled in the other journal of said housing and the cooperative journal of said cover and projecting therefrom, driving and driven sprockets mounted on said drive shaft and the shaft of said cylinder within said housing, chains trained around said sprockets, pairs of idler shaft journals formed in said housing and said cover and disposed in transversely spaced relationship on opposite sides of the center line between said drive shaft and the shaft of said cylinder, an idler shaft positioned in one of said pairs of idler shaft journals and having an eccentric bearing portion positioned within said housing, an idler sprocket rotatively mounted on said eccentric portion and engaged with said chains, a squared end on the end of said idler shaft projecting from the bottom of said housing for adjustment of said idler shaft, a set screw engageable with said idler shaft and carried by said cover, ears on said housing projecting from the opposite sides of said housing and spaced from the axis of the journal of said cylinder shaft, a longitudinally adjustable link selectively connected to one of said ears and depending below said housing alongside of said base, a lever pivotally supported alongside of said base and having one end connected to said link, a notched holding bracket positioned adjacent the opposite end of said lever to hold said lever and link in vertically adjusted positions, a drive pulley mounted on the outer end of said drive shaft, and a belt connecting said motor with said pulley.

2. In combination with a carding machine having a rotatable cylinder mounted on a base with the shaft of the cylinder projecting therefrom and an electric motor mounted in offset relation to one end of said cylinder and parallel to said shaft, a drive adaptor comprising, a chambered housing disposed on its side and having spaced journals formed in the bottom thereof, one of said journals receiving the projecting end of said shaft, a cover for said housing having other journals formed therein cooperative with the journals in said housing, a drive shaft journaled in the other journal of said housing and the cooperative journal of said cover and projecting therefrom, driving and driven sprockets mounted on said drive shaft and the shaft of said cylinder within said housing, chains trained around said sprockets, pairs of idler shaft journals formed in said housing and said cover and disposed in transversely spaced relationship relative to the center line between said drive shaft and the shaft of said cylinder, an idler shaft positioned in one of said pairs of idler shaft journals and having an eccentric bearing portion positioned within said housing, an idler sprocket rotatively mounted on said eccentric portion and engaged with said chains, a squared end on the end of said idler shaft projecting from said housing for adjustment of said idler shaft, a set screw engageable with said idler shaft, ears projecting from the opposite sides of said housing and spaced from the axis of the journal of said cylinder shaft, a link connected to one of said ears and depending below said housing alongside of said base, a lever pivotally supported alongside of said base and having one end connected to said link, a notched holding bracket positioned adjacent said lever to hold said lever and link in vertically adjusted positions, a drive pulley mounted on said drive shaft, and a belt connecting said motor with said pulley.

3. In combination with a machine having a shaft projecting therefrom and an electric motor mounted in offset relation to one end of and parallel to said shaft, a drive adaptor comprising, a chambered housing disposed on its side and having spaced journals formed in the bottom thereof, one of said journals receiving the projecting end of said shaft, a cover for said housing having other journals formed therein cooperative with the journals in said housing, a drive shaft journaled in the other journal of said housing and the cooperative journal of said cover and projecting therefrom, driving and driven sprockets mounted on said drive shaft and the shaft of said machine within said housing, a chain trained around said sprockets, pairs of idler shaft journals formed in said housing and said cover and disposed between said shafts and in transversely spaced relationship with respect to the center line between said drive shaft and the shaft of said machine, an idler shaft positioned in one of said pairs of idler shaft journals and having an eccentric bearing portion positioned within said housing, an idler sprocket rotatively mounted on said eccentric portion and engaged with said chain, a non-circular end on said idler shaft projecting from the bottom of said housing for adjustment of said idler shaft, a set screw engageable with said idler shaft and carried by said cover, ears projecting from the opposite sides of said housing and spaced from the axis of the journal of said machine shaft, a link connected to one of said ears and depending below said housing alongside of said machine, a lever pivotally supported alongside of said machine and having one end connected to said link, a notched holding bracket positioned adjacent the opposite end of said lever to hold said lever and link in vertically adjusted positions, a drive pulley mounted on the outer end of said drive shaft, and a belt connecting said motor with said pulley.

4. In combination with a machine having a shaft projecting therefrom and an electric motor mounted in offset relation to one end of and parallel to said shaft, a drive adaptor comprising, a chambered housing disposed on its side and having spaced journals formed in the bottom thereof, one of said journals receiving the projecting end of said shaft, a cover for said housing having other journals formed therein cooperative with the journals in said housing, a drive shaft journaled in the other journal of said housing and the cooperative journal of said cover and projecting therefrom, driving and driven sprockets mounted on said drive shaft and the shaft of said machine within said housing, a chain trained around said sprockets, pairs of idler shaft journals formed in said housing and said cover and disposed between said shafts and in transversely spaced relationship with respect to the center line between said drive shaft and the shaft of said machine, an idler shaft positioned in one of said pairs of idler shaft journals and having an eccentric bearing portion positioned within said housing, an idler sprocket rotatively mounted on said eccentric portion and engaged with said chain, a noncircular end on said idler shaft projecting from said housing for adjustment of said idler shaft, a set screw engageable with said idler shaft, ears projecting from the opposite sides of said housing and spaced from the axis of the journal of said machine shaft, a link connected to one of said ears and depending below said housing alongside of said machine, a lever pivotally supported alongside of said machine and having one end connected to said link, a notched holding bracket positioned adjacent said lever to hold said lever and link in vertically adjusted positions, a drive pulley mounted on said drive shaft, and a belt connecting said motor with said pulley.

5. In combination with a machine having an input shaft projecting therefrom and an electric motor mounted in offset relation to one end of said shaft, a drive adapter comprising, a chambered housing having spaced parallel journals formed therein, one of said journals receiving the projecting end of said shaft, a drive shaft journaled in the other journal of said housing and projecting therefrom, driving and driven sprockets mounted on said drive shaft and the shaft of said machine within said housing, a chain trained around said sprockets, an idler shaft journal formed in said housing between said drive shaft and the shaft of said machine, and idler shaft positioned in said idler shaft journal and having an eccentric bearing portion positioned within said housing, an idler sprocket rotatively mounted on said eccentric portion and engaged with said chain, a non-circular end on said idler shaft for adjustment of said idler shaft, a set screw engageable with said idler shaft, an anchor portion on said housing and spaced from the axis of the journal of said machine shaft, a link connected to said anchor portion, a lever pivotally supported alongside of said machine and having one end connected to said link, a notched holding bracket positioned adjacent said lever to hold said lever and link in adjusted positions, a drive pulley mounted on said drive shaft, and a belt connecting said motor with said pulley.

6. An individual motor drive adaptor for a carding machine having a main shaft projecting therefrom comprising, a chambered housing having a journal formed therein adapted to receive the end of said shaft, a cover removably secured to said housing and having a second journal formed therein cooperative with said first journal, a drive shaft journaled in said housing and said cover and spaced from said first two journals, a drive pulley on the outer end of said drive shaft adapted to be belt connected to an electric motor positioned adjacent to said machine, sprockets mounted on the shaft of said machine and said drive shaft within said housing, a chain trained around said sprockets, idler shaft journals formed in said housing and said cover and disposed in aligned pairs between said shafts and on opposite sides of a line between said sprockets, an idler shaft journaled in one of said pairs of journals and having an eccentric portion positioned within said housing, an idler sprocket rotatively mounted on said eccentric portion, a non-circular end on said idler shaft projecting from said housing, set screw means for clamping said idler shaft in adjusted position, anchor portions formed on opposite sides of said housing and spaced from the journal for the shaft of said machine, an adjustable link connected to one of said anchor portions and depending from said housing, a lever having its swinging end connected to said link and adapted to be pivotally supported alongside of said machine, and releasable lock means for the opposite end of said lever adapted to be fixedly secured alongside of said machine in spaced relationship with the fixed pivot of the lever.

7. An individual motor drive adaptor for a carding machine having a main shaft projecting therefrom comprising, a chambered housing having a journal formed therein adapted to receive the end of said shaft, a cover removably secured to said housing and having a second journal formed therein cooperative with said first journal, a drive shaft journaled in said housing and said cover and spaced from said first two journals, a drive pulley on the outer end of said drive shaft adapted to be belt connected to an electric motor positioned adjacent to said machine, sprockets mounted on the shaft of said machine and said drive shaft within said housing, a chain trained around said sprockets, idler shaft journals formed in said housing and said cover and disposed in aligned pairs between said shafts and on opposite sides of a line between the center line of said sprockets, an idler shaft journaled in one of said pairs of journals and having an eccentric portion positioned within said housing, an idler sprocket rotatively mounted on said eccentric portion, a non-circular end on said idler shaft projecting from said housing, set screw means for clamping said idler shaft in adjusted position, anchor portions on opposite sides of said housing and spaced from the journal for the shaft of said machine, an adjustable link connected to one of said anchor portions and depending from said housing, a lever having its swinging end connected to said link and adapted to be pivotally supported alongside of said machine, and releasable lock means for said lever adapted to be fixedly secured alongside of said machine in spaced relationship with the fixed pivot of the lever.

8. An individual motor drive adaptor for a machine having a main shaft projecting therefrom comprising a chambered housing having a journal formed therein adapted to receive the end of said shaft, a cover removably secured to said housing and having a second journal formed therein cooperative with said first journal, a drive shaft journaled in said housing and said cover and spaced from said first two journals, a drive pulley on the outer end of said drive shaft adapted to be belt connected to an electric motor positioned adjacent to said machine, sprockets mounted on the shaft of said machine and said drive shaft within said housing, a chain trained around said sprockets, idler shaft journals formed in said housing and said cover and disposed in aligned pairs on opposite sides of the center line of said sprockets, an idler shaft journaled in one of said pairs of journals and having an eccentric portion positioned within said housing, an idler sprocket rotatively mounted on said eccentric portion, a non-circular end on said idler shaft projecting from said housing, means for clamping said idler shaft in adjusted position, anchor portions on opposite sides of said housing and spaced from the journal for the shaft of said machine, a link connected to one of said anchor portions, a lever having its swinging end connected to said link and adapted to be pivotally supported alongside of said machine, and releasable lock means for said lever adapted to be fixedly secured alongside of said machine in spaced relationship with the fixed pivot of the lever.

9. An individual motor drive adaptor for a machine having a main shaft projecting therefrom comprising, a chambered housing having a journal formed therein adapted to receive the end of said shaft, a drive shaft journaled in said housing and spaced from said first journal, a drive pulley on the outer end of said drive shaft adapted to be belt connected to an electric motor positioned adjacent to said machine, sprockets mounted on the shaft of said machine and said drive shaft within said housing, a chain trained around said sprockets, idler shaft journals formed in said housing and disposed on opposite sides of the center line of said sprockets, an idler shaft journaled in one of said journals and having an eccentric portion positioned within said housing, an idler sprocket rotatively mounted on said eccentric portion, a non-circular end on said idler shaft projecting from said housing, means for clamping said idler shaft in adjusted position, anchor portions on opposite sides of said housing and spaced from the journal for the shaft of said machine, a link connected to one of said anchor portions, a lever having its swinging end connected to said link and adapted to be pivotally supported alongside of said machine, and releasable lock means for said lever adapted to be fixedly secured alongside of said machine in spaced relationship with the fixed pivot of the lever.

10. An individual motor drive adaptor for a machine having a main shaft projecting therefrom comprising, a housing having a journal formed therein adapted to receive the end of said shaft, a drive shaft journaled in said housing and spaced from said first journal, a drive pulley on said drive shaft adapted to be belt connected to an electric motor positioned adjacent to said machine, sprockets mounted on the shaft of said machine and said drive shaft within said housing, a chain trained around said sprockets, an idler shaft journal formed in said housing and disposed between said sprockets, an idler shaft journaled in said last journal and having an eccentric portion positioned within said housing, an idler sprocket rotatively mounted on said eccentric portion, a non-circular end on said idler shaft, means for clamping said idler shaft in adjusted position, an anchor portion on said housing and spaced from the axis of the journal for the shaft of said machine, and means connected to said anchor portion adapted to adjustably and non-rotatively hold said housing relatively to said shaft of said machine.

11. An individual motor drive adaptor for a machine having a main shaft projecting therefrom comprising, a housing having a journal formed therein adapted to receive the end of said shaft, a drive shaft journaled in said housing and spaced from said first journal, a drive pulley on said drive shaft adapted to be belt connected to an electric motor positioned adjacent to said machine, sprockets mounted on the shaft of said machine and said drive shaft within said housing, a chain trained around said sprockets, an idler shaft journal formed in said housing and disposed between said sprockets, an idler shaft journaled in said last journal and having an eccentric portion positioned within said housing, an idler sprocket rotatively mounted on said eccentric portion, means for clamping said idler shaft in adjusted position, an anchor portion on said housing and spaced from the axis of the journal for the shaft of said machine, and means connected to said anchor portion adapted to adjustably and non-rotatively hold said housing relatively to said shaft of said machine.

12. An individual motor drive adaptor for a machine having a main shaft projecting therefrom comprising, a housing having a journal formed therein adapted to receive the end of said shaft, a drive shaft journaled in said housing and spaced from said first journal, a drive pulley on said drive shaft adapted to be belt connected to an electric motor positioned adjacent to said machine, sprockets mounted on the shaft of said machine and said drive shaft within said housing, a chain trained around said sprockets, means supporting an idler shaft in said housing between said sprockets, an idler sprocket rotatively mounted on said idler shaft, means for adjusting and clamping said idler shaft in transversely adjusted positions relative to the line between said main and drive shafts, an anchor portion on said housing and spaced from the axis of the journal for the shaft of said machine, and means connected to said anchor portion adapted to adjustably and non-rotatively hold said housing relatively to said shaft of said machine.

13. An individual motor drive adaptor for a machine having a main shaft projecting therefrom comprising, a chambered housing having a journal formed therein adapted to receive the end of said shaft, a drive shaft journaled in said housing and spaced from said first journal, a drive pulley on the outer end of said drive shaft adapted to be belt connected to an electric motor positioned adjacent to said machine, sprockets mounted on the shaft of said machine and said drive shaft within said housing, a chain trained around said sprockets, idler shaft journals formed in said housing and disposed in spaced relationship transversely with respect to a line between said sprockets, an idler shaft journaled in one of said journals and having an eccentric portion positioned within said housing, an idler sprocket rotatively mounted on said eccentric portion, a non-circular end on said idler shaft projecting from said housing, means for clamping said idler shaft in adjusted position, anchor portions on opposite sides of said housing and spaced from the journal for the shaft of said machine, a link connected to one of said anchor portions, a lever having its swinging end connected to said link and adapted to be pivotally supported alongside of said machine, and releasable lock means for said lever adapted to be fixedly secured alongside of said machine in spaced relationship with the fixed pivot of the lever.

14. An individual motor drive adaptor for a machine having a main shaft projecting therefrom comprising, a chambered housing having a journal formed therein adapted to receive the end of said shaft, a drive shaft journaled in said housing and spaced from said first journal, a drive pulley on the outer end of said drive shaft adapted to be belt connected to an electric motor positioned adjacent to said machine, sprockets mounted on the shaft of said machine and said drive shaft within said housing, a chain trained around said sprockets, idler shaft journals formed in said housing and disposed in spaced relationship transversely with respect to a line between said sprockets, an idler shaft journaled in one of said journals and having an eccentric portion positioned within said housing, an idler sprocket rotatively mounted on said eccentric portion, a non-circular end on said idler shaft projecting from said housing, means for clamping said idler shaft in adjusted position, anchor portions on opposite sides of said housing and spaced from the journal for the shaft of said machine, and holding means connected to one of said anchor portions adapted to be fixedly secured alongside of said machine to hold said housing against rotation on the shaft of said machine.

References Cited in the file of this patent

UNITED STATES PATENTS

| Number | Name | Date |
|---|---|---|
| 1,580,308 | Lawson | Apr. 13, 1926 |
| 2,029,832 | Pierson | Feb. 4, 1936 |
| 2,311,993 | Olsen | Feb. 23, 1943 |